Figure 23:
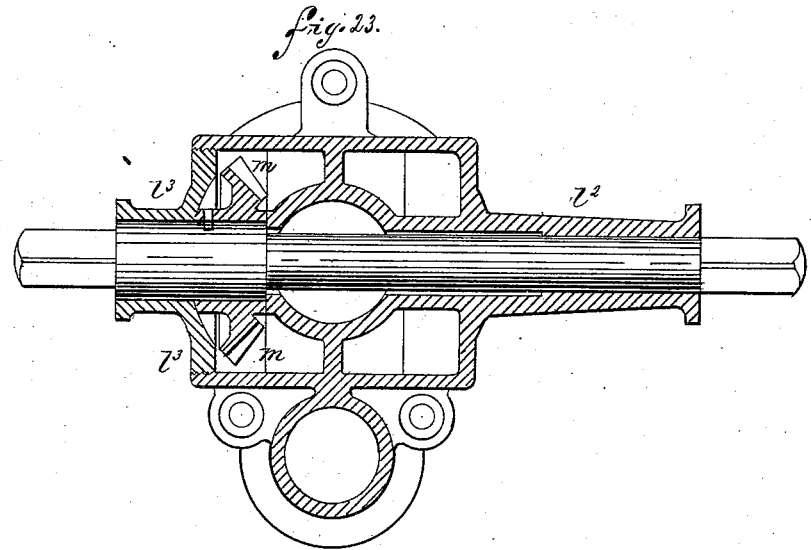

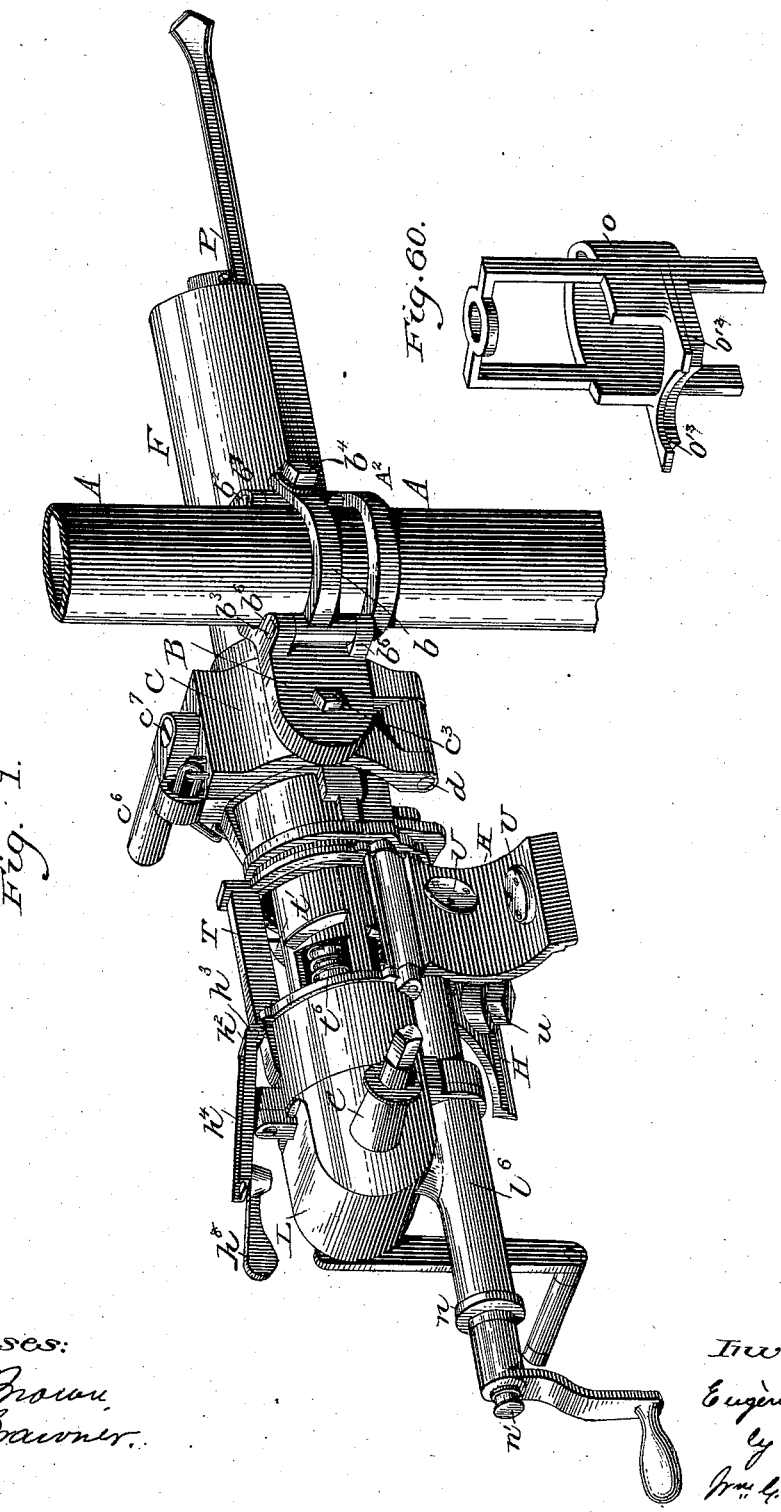

(No Model.) 12 Sheets—Sheet 2.
E. MOREAU.
ROCK DRILL.
No. 347,438. Patented Aug. 17, 1886.
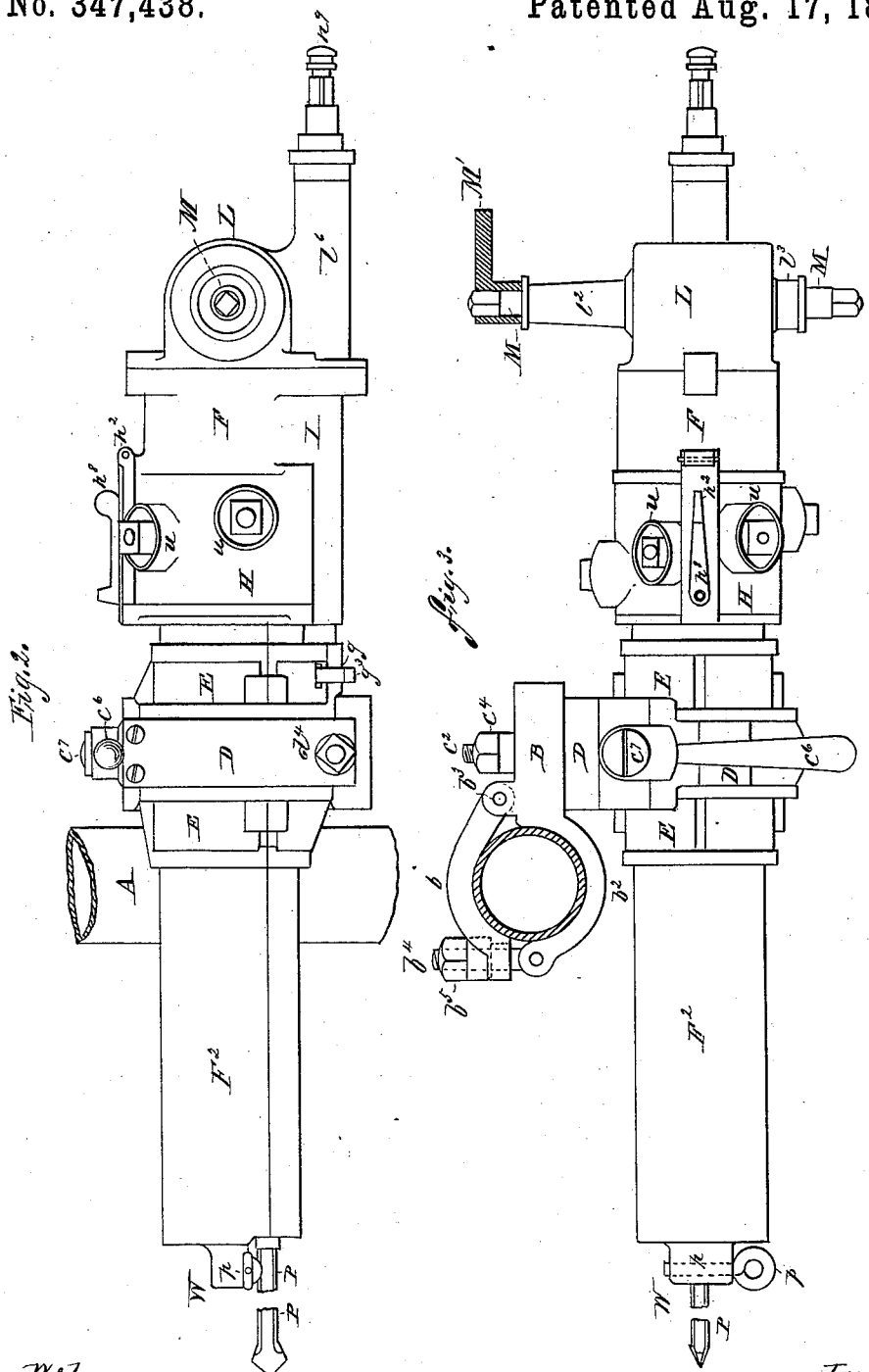
Witnesses
C. W. H. Brown
J. F. Brauner
Inventor
Eugène Moreau
by his atty
Wm. G. Britton (No Model.) 12 Sheets—Sheet 3.
E. MOREAU.
ROCK DRILL.
No. 347,438. Patented Aug. 17, 1886.
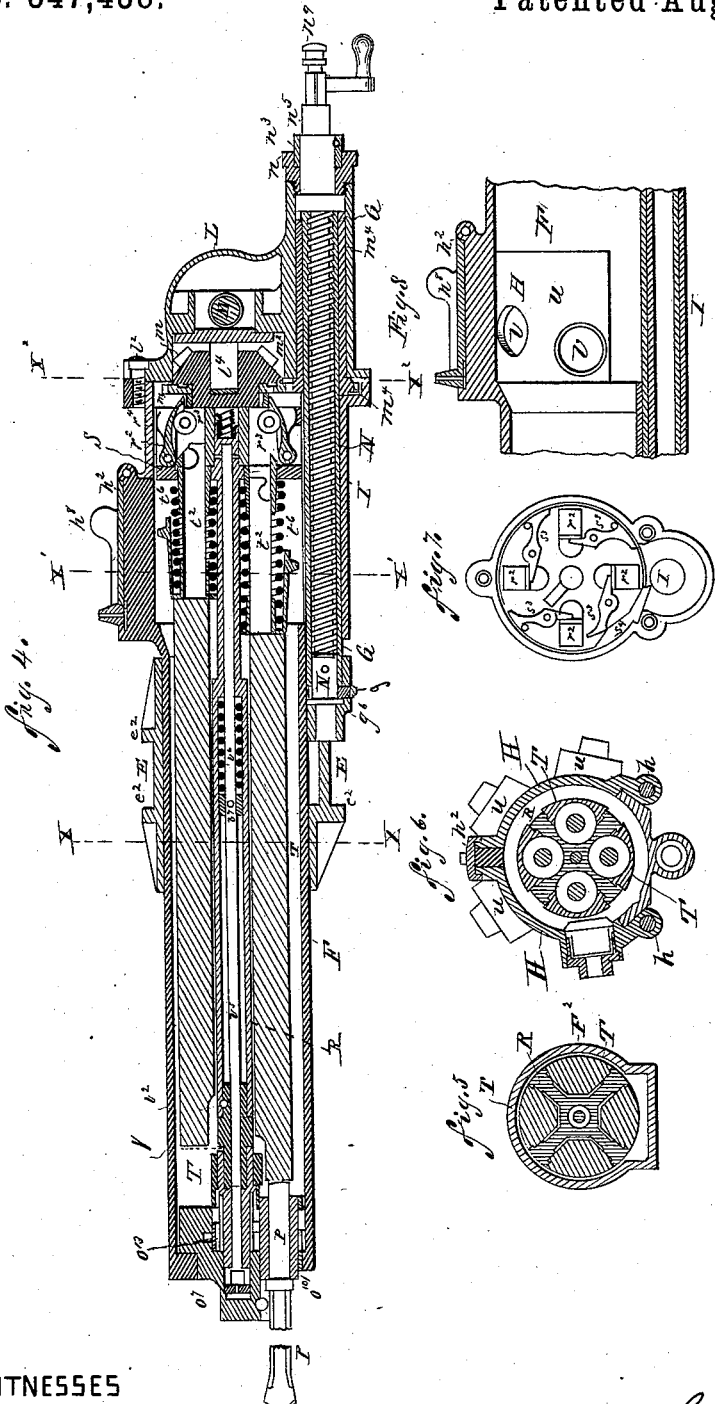
WITNESSES
INVENTOR
Eugène Moreau
by his Atty
Wm G. Button (No Model.) 12 Sheets—Sheet 4.
E. MOREAU.
ROCK DRILL.
No. 347,438. Patented Aug. 17, 1886.
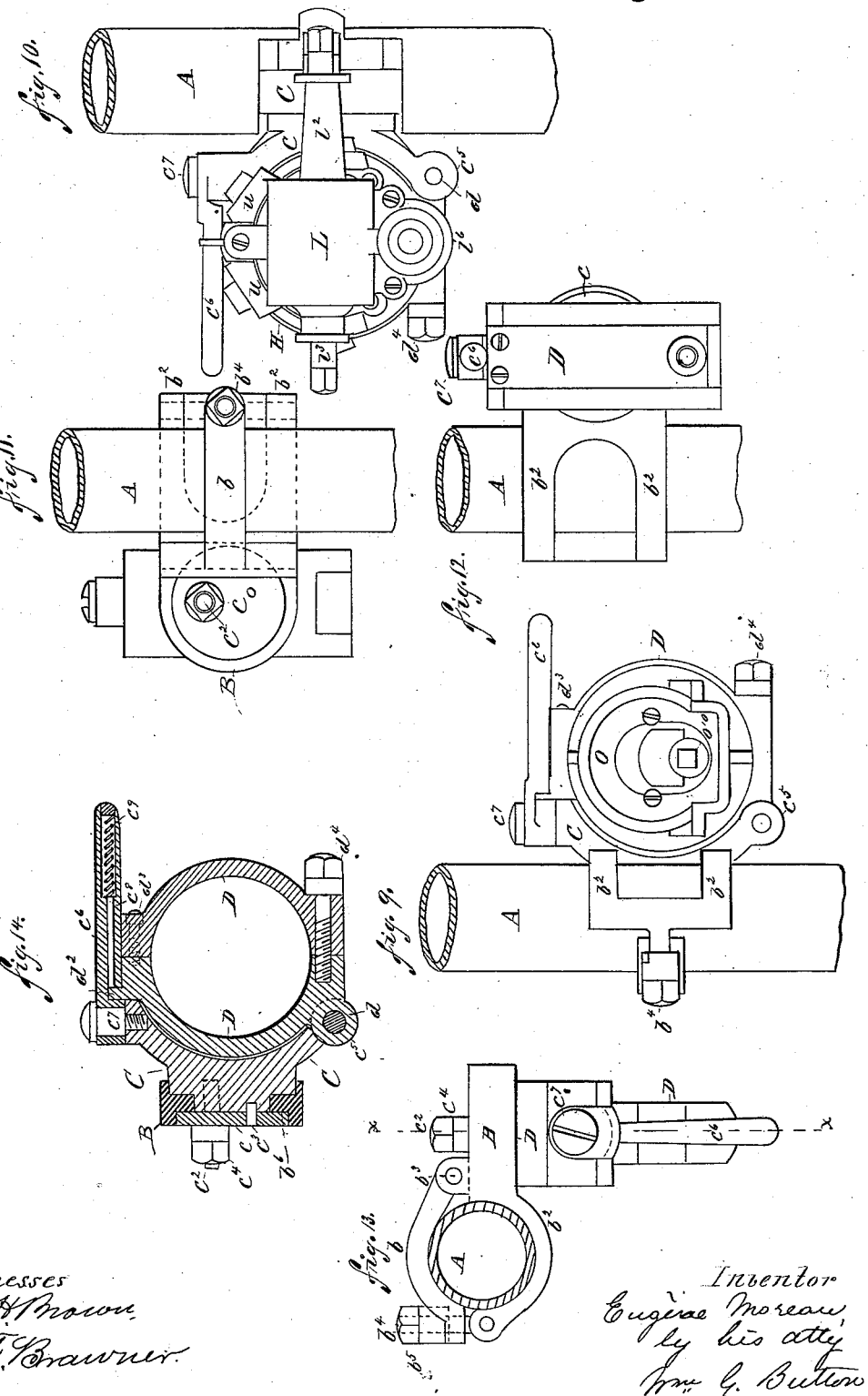
Witnesses
C. W. H. Brown
T. F. Brawner
Inventor
Eugène Moreau
by his atty
Wm. G. Button (No Model.) 12 Sheets—Sheet 5.
E. MOREAU.
ROCK DRILL.
No. 347,438. Patented Aug. 17, 1886.
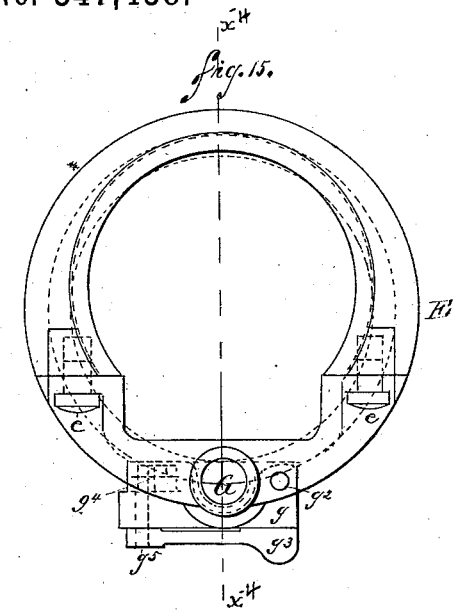
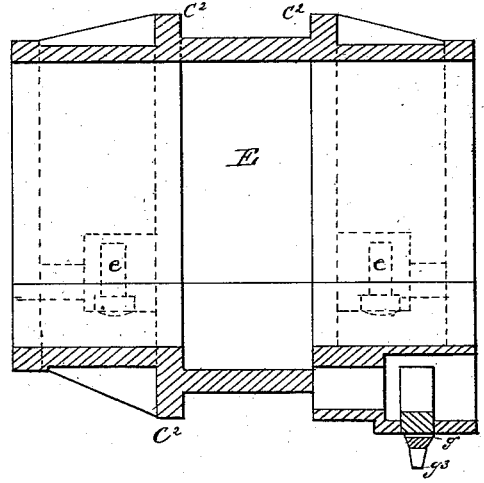
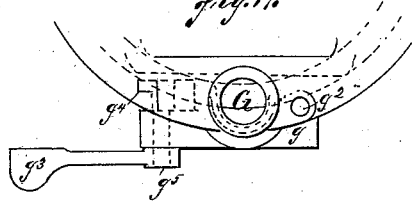
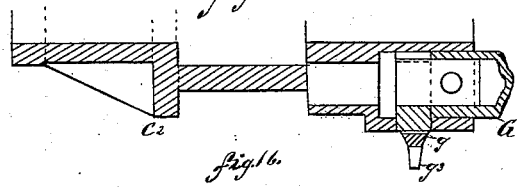
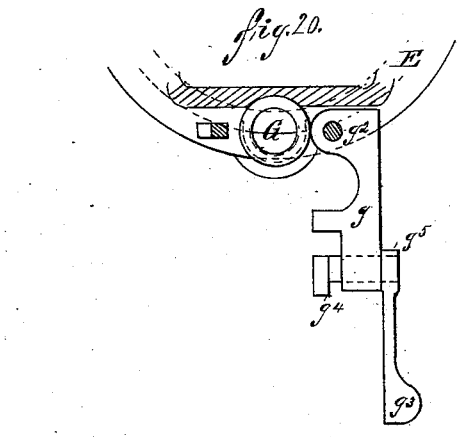
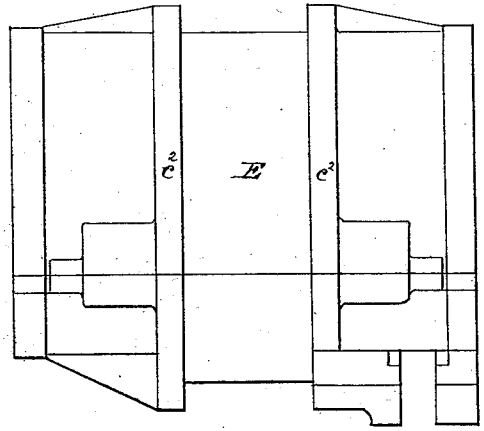
Witnesses
C. W. H Brown.
T. F. Brauner.
Inventor
Eugene Moreau
by his atty
Wm G Dutton (No Model.) 12 Sheets—Sheet 6.
E. MOREAU.
ROCK DRILL.
No. 347,438. Patented Aug. 17, 1886.
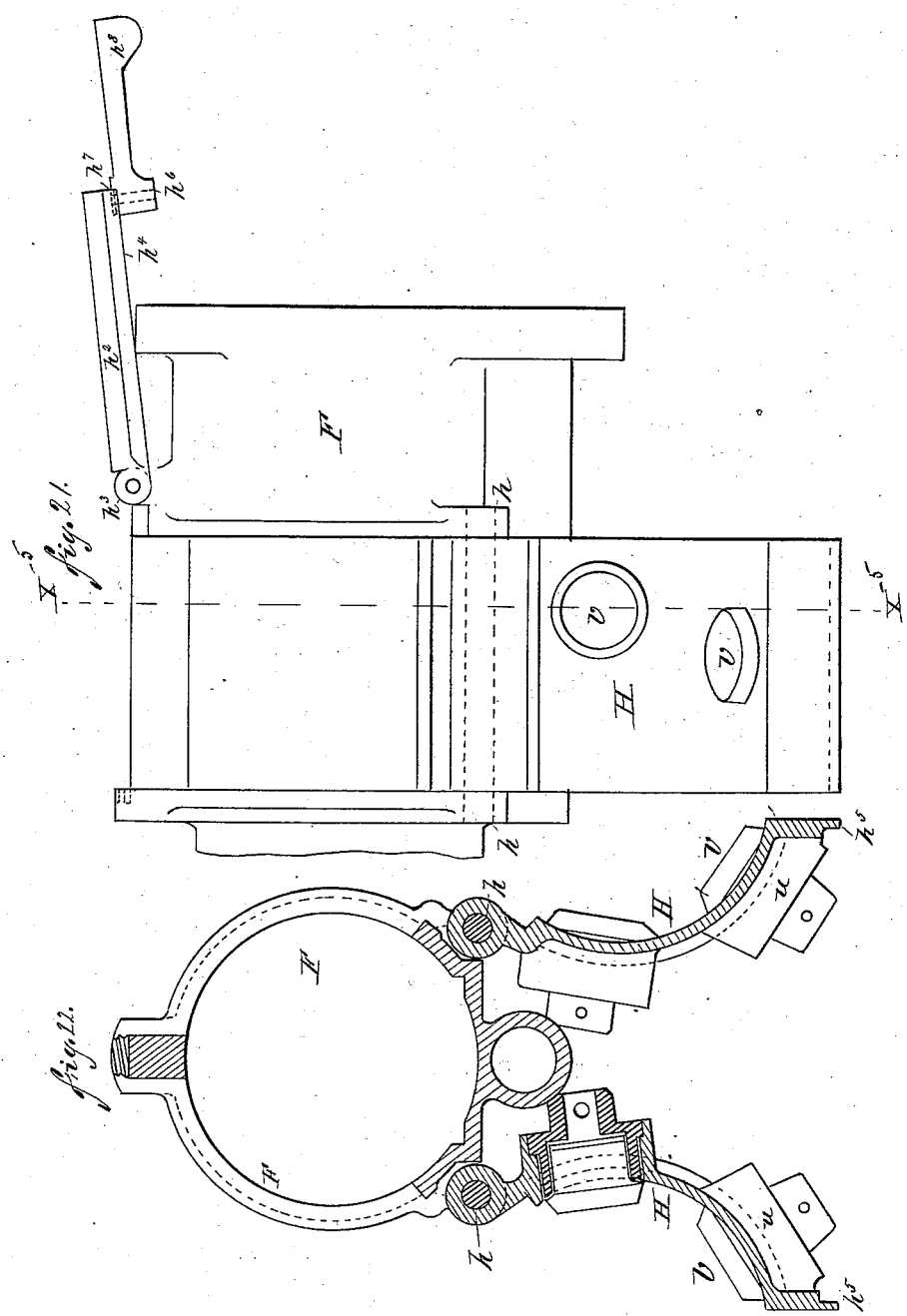
WITNESSES
INVENTOR
Eugène Moreau
By his Attorney (No Model.)  12 Sheets—Sheet 7.

E. MOREAU.
ROCK DRILL.

No. 347,438.  Patented Aug. 17, 1886.

WITNESSES:
C. W. H. Brown,
T. F. Brawner.

INVENTOR
Eugène Moreau
BY Wm. G. Button
his
ATTORNEY (No Model.) 12 Sheets—Sheet 8.
E. MOREAU.
ROCK DRILL.
No. 347,438. Patented Aug. 17, 1886.
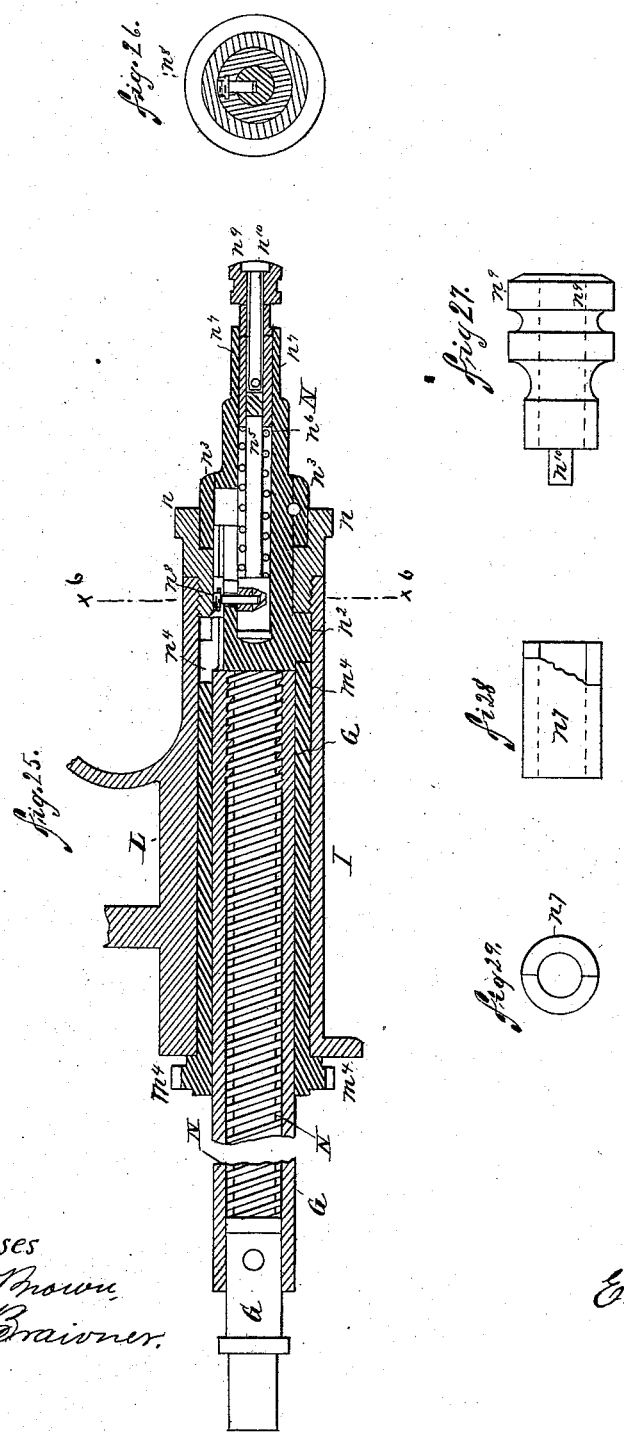

(No Model.) 12 Sheets—Sheet 9.
E. MOREAU.
ROCK DRILL.
No. 347,438. Patented Aug. 17, 1886.
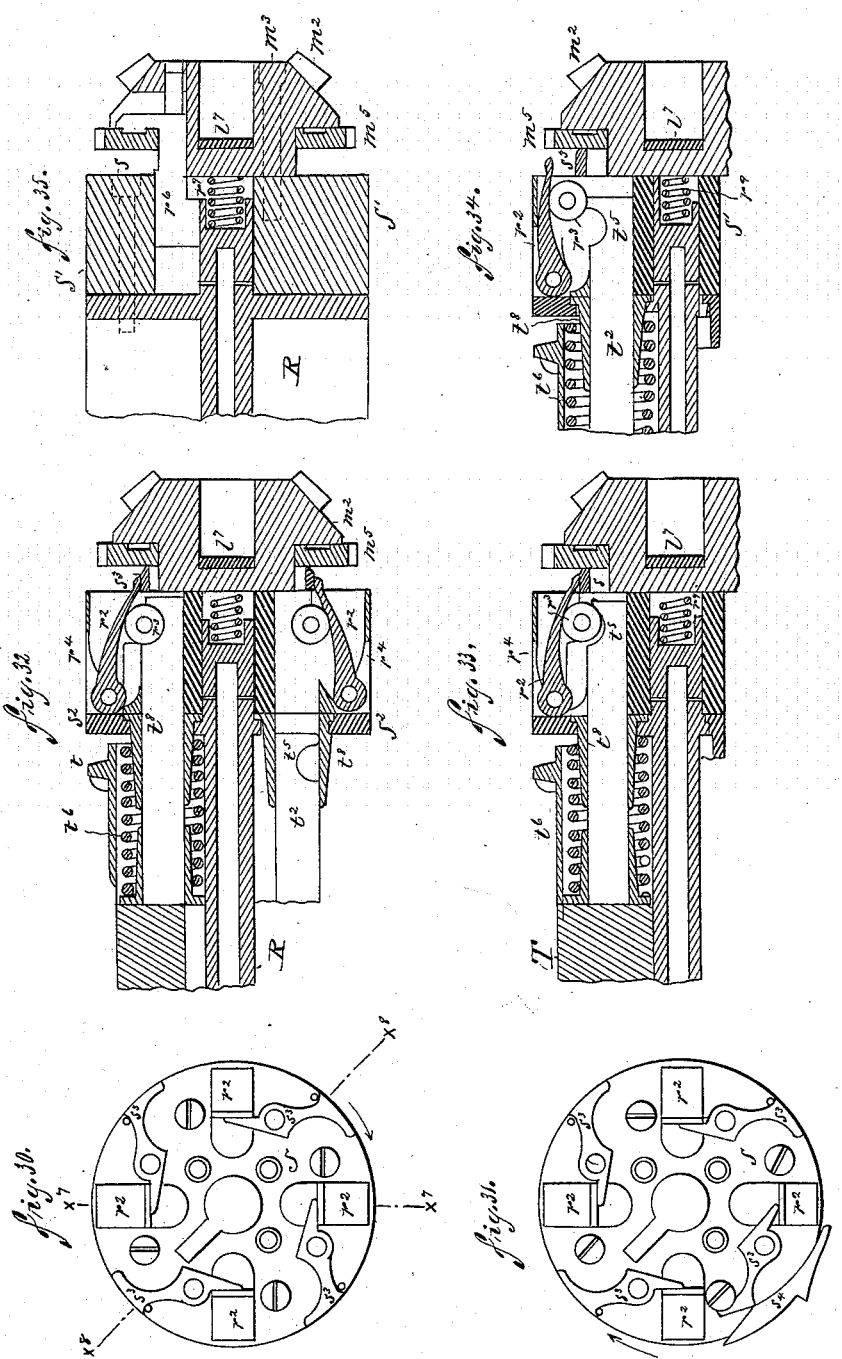
Witnesses
C. W. H. Brown.
T. F. Brawner.
Inventor
Eugène Moreau
by his atty
Wm. G. Button (No Model.)  
12 Sheets—Sheet 10.
E. MOREAU.
ROCK DRILL.
No. 347,438.  Patented Aug. 17, 1886.
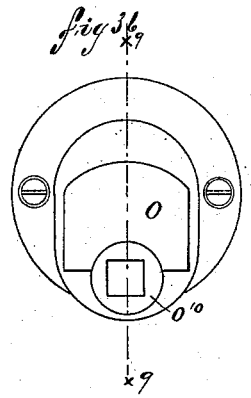
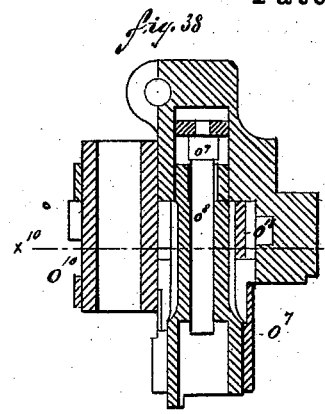
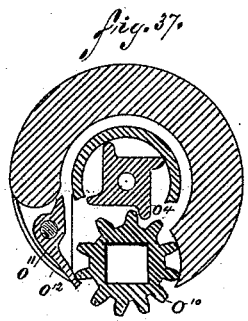
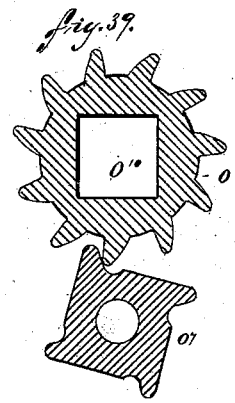
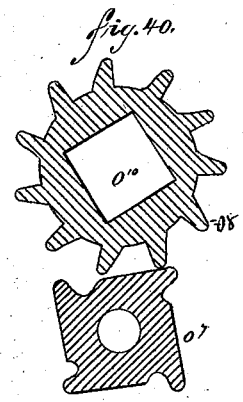
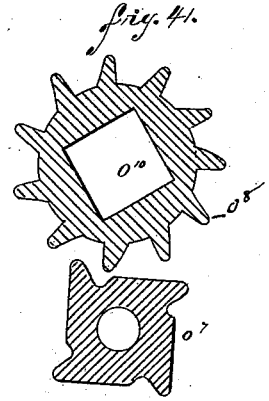
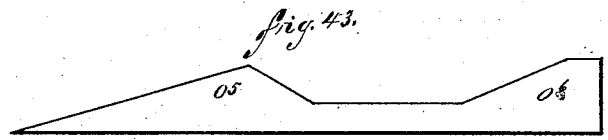
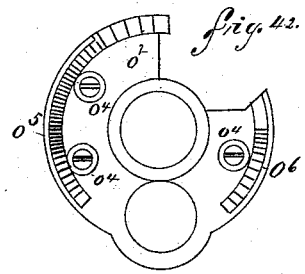
WITNESSES:  
C. H. H. Brown.  
F. F. Brawner.
INVENTOR  
Eugène Moreau  
BY  
Wm. G. Button  
ATTORNEY (No Model.)　　　　　　　　　　　　　　12 Sheets—Sheet 11.
E. MOREAU.
ROCK DRILL.
No. 347,438.　　　　　　　Patented Aug. 17, 1886.
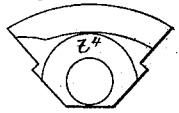
Fig. 44.
Fig. 45.　　　Fig. 47.　　　Fig. 46.
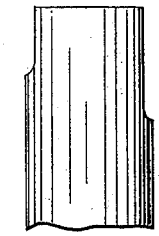  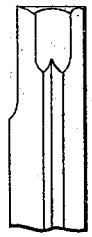
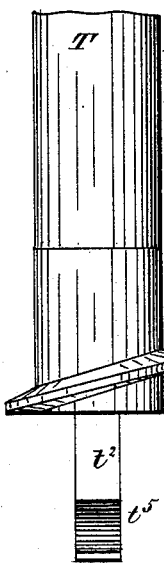  
Fig. 48.
WITNESSES:　　　　　　　　　　　　INVENTOR
C. H. H. Brown,　　　　　　　　　　Eugène Moreau
T. F. Brawner.　　　　　　　　BY Wm. G. Burton
　　　　　　　　　　　　　　　　　　　his
　　　　　　　　　　　　　　　　ATTORNEY
N. PETERS, Photo-Lithographer, Washington, D. C.

(No Model.)  12 Sheets—Sheet 12.
E. MOREAU.
ROCK DRILL.
No. 347,438.  Patented Aug. 17, 1886.
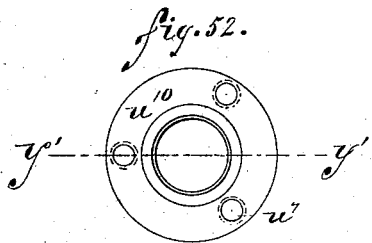
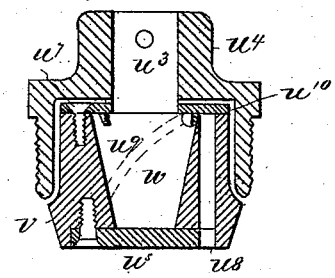
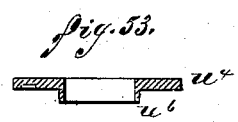
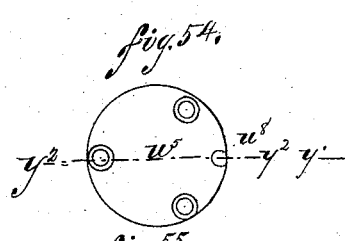
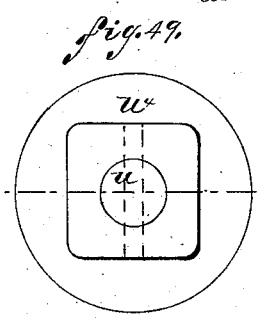
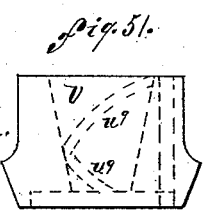
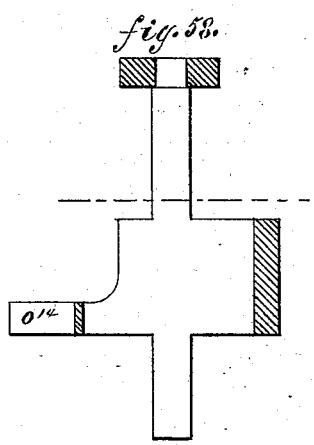
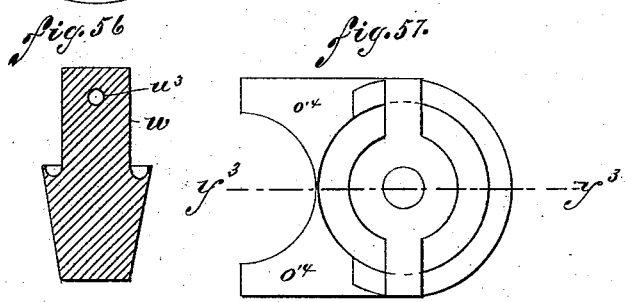
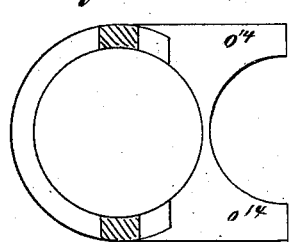
WITNESSES:
C. W. H. Brown.
T. F. Brawner.
INVENTOR
Eugène Moreau
BY Wm. G. Button
his
ATTORNEY
N. PETERS, Photo-Lithographer, Washington, D. C.

UNITED STATES PATENT OFFICE.

EUGÈNE MOREAU, OF SAN FRANCISCO, CALIFORNIA, ASSIGNOR TO
THEODORE W. STERLING, OF NEW YORK, N. Y.

ROCK-DRILL.

SPECIFICATION forming part of Letters Patent No. 347,438, dated August 17, 1886.

Application filed August 27, 1885. Serial No. 175,447. (No model.)

*To all whom it may concern:*

Be it known that I, EUGÈNE MOREAU, of the city of San Francisco, in the State of California, have invented certain new and useful Improvements in Hand Rock-Drills, of which the following is a full, clear, and exact description.

This invention particularly relates to hand rock-drilling machines in which are combined a series of reciprocating hammers arranged to revolve in concert about a common center, each being successively brought into a line with the drill-tool, and after being first forced back by cams against a spring is released to deliver its blow upon the head of the drill-tool, the drill-tool itself revolving about its own axis through a portion of a revolution between the hammer blows. In these general features the drill resembles the machines described in the patents already granted to me—to wit, Nos. 268,426 and 268,427, dated December 5, 1882, and No. 269,952, dated January 2, 1883.

The invention herein described consists of the following improvements, all being combined to reach a common end; in a method of connecting the drill tool with the machine, dispensing with the ordinary drill-clamp; in the arrangement upon a revolving frame of a number of sector-shaped hammers, each having a helical cam forming an integral part of it, and a series of rollers mounted upon the inside of the inclosing-case of the machine in a helical curve forming a camway, which, acting in combination with the hammer-cams, produces the required rotation of the hammer-frame. This construction permits the hammers to be made of a single solid piece of metal. The arrangement of the hammer-driving springs, whereby all friction upon the surrounding parts is avoided; the addition of an improved device holding the hammers in place after the compression of the helical driving-springs and controlling their release, which insures thereby accuracy and rapidity in the delivery of the blows, and the greatest possible freedom from wear and tear; the arrangement of parts whereby the hammer-springs are distended when the machine is at rest; the improved construction of the friction-rollers attached to the inside of the inclosing-case and acting as a camway to drive the hammers, whereby they are rendered self-oiling and nearly frictionless; in an improved automatic feed which adjusts itself perfectly to the work to be performed, and is thrown in or out of gear at pleasure; an improved device for causing the intermittent rotation of the drill-tool; in an improved construction of the frame of the machine whereby it acts as an inclosing-case to protect the working parts from dust or accidental injury, and which is provided with openings for examination and lubrication; an improved device for attaching the machine to its supports, so that it can be readily and safely connected and disconnected, as occasion may require; a device whereby the drill can be instantly withdrawn from the bore and as quickly brought again into position without altering the axial line of the work; a device whereby the path of motion of the crank-arms is always in a vertical plane whatever may be the position of the primary support or column, which is a matter of great convenience in working; certain improvements in the general construction of the elevating and depressing devices, and an improved construction of the clamp for connecting the machine with the supporting-column.

In addition to the above-stated improvements there are many minor features of improvement.

The whole machine may be briefly described as consisting of a suitable support having adjustably secured to it, by an improved clamping device, a sleeve in which a tubular case containing the drill-operating mechanism can slide forward in a uniform direction under the action of a feed-screw operated so as to automatically adjust itself to the requirements of the work. Within this inclosing and protecting "case" or "shell," as I call it, are arranged on the angles of a cross-shaped core-frame four reciprocating hammers of such cross-section that hammers and frame fitting compactly together form a cylinder, through the center of which a rod passes, which acts as a feed-regulator, and the frame itself connects directly with a four-toothed cam gearing with a spur-wheel on the drill-socket, and rotates the drill-tool, between the successive hammer-blows, through a small portion of a revolution. The hammers are actuated by helical springs, and are drawn back against the retractive force of these springs by the rotation of a crank-shaft operated by hand and transmitting its motion through intermediate gearing to the hammer-frame, which, rotating with its hammers, forces certain cams on these hammers into contact with rollers set helically on the inside of a portion of the inclosing-case, hinged for convenience of removal, cleansing, or oiling of rollers, and for other purposes, which will be hereinafter more fully set forth. These gates are provided with a secure and easily-operated locking attachment, which I also describe in another place. The hammers are held, when not in a proper position to strike a blow, by notches in their ends in combination with a system of roller-bearing spring levers or triggers, which are withdrawn at the proper instant by the revolution of the hammer-frame itself by means of a cam fixed to the shell or inclosing-case. Other cams enable the hammers to pass over the head of the tool and assist the cams, which force the hammers to compress their driving-springs.

The whole machine is so constructed that it can be elevated or depressed, and operated at any angle, vertical or horizontal, with the crank-shafts in the most convenient position. There are no loose nuts or bolts. The oiling is principally done by merely putting a quantity in through the opening of the gates and allowing it to distribute itself by the shock of the hammer-blows. The drill-tool can be removed and reinserted at will without interfering with its perfect alignment. The automatic feed can be thrown out of gear, and the tool fed forward by hand or withdrawn at pleasure by a very simple operation.

In the description of figures "front end" means the end carrying the drill-tool, and "rear end" the opposite end.

Figure 24:
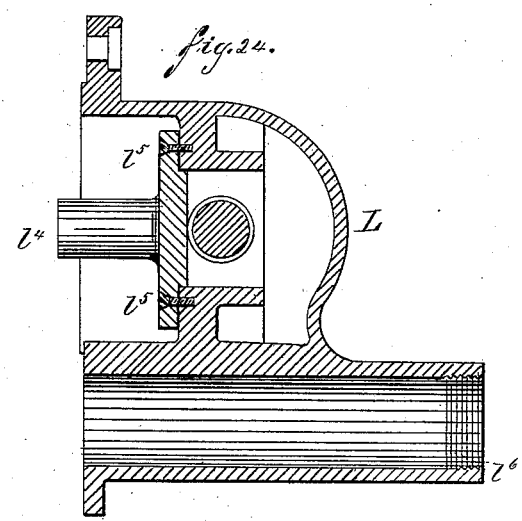

In the drawings, Figure 1 is a perspective view of the complete machine mounted upon its supporting-column ready for use, with the gates of inclosing-case thrown open. Fig. 2 is a side elevation of the complete machine mounted upon its column. Fig. 3 is a top view of the complete machine. Fig. 4 is a longitudinal vertical section of the whole machine. Fig. 5 is a cross-section on line X X of Fig. 4, showing the tubular shell or inclosing-case, the revolving hammer-frame, and the hammers. Fig. 6 is a cross-section on the line X' X' of Fig. 4, showing the gates of inclosing-shell, locking device, the revolving frame, and the hammers in section at the point where their driving-springs are placed. Fig. 7 is a rear view of the machine after removing the box containing the driving mechanism. This view is nearly on a line with $X^2 X^2$, Fig. 4. Fig. 8 is a longitudinal section of the middle portion of the outer inclosing case or shell, showing the cam-rollers upon one of the gates, which is shown closed and locked. Fig. 9 is a front end view of the complete machine attached to its supporting-column. Fig. 10 is a rear end view of the complete machine and column. Fig. 11 is an elevation of the clamp, bracket, and column. (The machine is not shown.) Fig. 12 is a front view or a view taken from the machine side of the clamp, bracket, and column, the machine itself being removed. Fig. 13 is a plan view of the same parts. Fig. 14 is a vertical cross-section of the same on the line $X^3 X^3$ of Fig. 13. Fig. 15 is a rear end view of the sleeve E in detail. Fig. 16 is a side elevation of the sleeve E. Fig. 17 is a longitudinal vertical section of the sleeve on line $X^4 X^4$ of Fig. 15. Fig. 18 is a longitudinal section of the lower part of the sleeve in the same plane as Fig. 17, but showing more in detail the method of fastening the feed-nut to the sleeve. Figs. 19 and 20 show in detail the locking device for securing the feed-nut in the sleeve. In Fig. 19 the thumb-piece is turned around, unlocking the latch which secures the feed-nut. In Fig. 20 the latch is turned back entirely, releasing the feed-nut. Fig. 21 is a side elevation of the middle part of the inclosing case or shell with the gates open and thrown down and the locking device thrown back. Fig. 22 is a vertical cross-section through the gates on the line $X^5 X^5$ of Fig. 21. Fig. 23 is a vertical cross-section of the driving-gear box through the axis of the driving-shaft. Fig. 24 is a vertical longitudinal section of this same box. Fig. 25 is a vertical longitudinal section of the lower part of the machine, showing in detail the feed-screws, feed-nut, and the mechanism of the hand-feed. Fig. 26 is a cross-section through line $X^6 X^6$ of Fig. 25. Fig. 27 is a detail view of the thumb-piece at the rear end of the feed-screw. Fig. 28 is a detail view of the cam-brush at the end of the feed-screw Fig. 29 is an end view of the same. Fig. 30 is a rear end view of the revolving hammer-frame with the driving-gear removed, showing more particularly the position of the four trigger-levers which act to retain and release the hammers. The corresponding retaining and releasing pawls are also shown in this figure. All the hammers are held in place. Fig. 31 is a view of the same parts, showing the position of the trigger or roller bearing lever and its pawl when acted upon by the releasing-cam. This figure is a repetition, on a larger scale, of Fig. 7. In both figures the direction of rotation is indicated by the arrows. Fig. 32 is a vertical longitudinal section through the rear part of the revolving hammer-frame on a line, $X^7 X^7$, of Fig. 30, showing more in detail the action of the retaining and releasing pawls, and the actuating-springs of the hammers. In this view one hammer is shown held by its trigger and the other released and forced forward by the action of its helical driving-spring, which is removed for greater clearness in the figure. Fig. 33 is a precisely similar partial section, but showing the trigger in the act of releasing a hammer. Fig. 34 is a repetition of Fig. 33, showing more particularly the position of the pawl immediately after the release of hammer. Fig. 35 is a longitudinal axial section of the rear part of the revolving hammer-frame on line $X^8 X^8$ of Fig. 30, showing more particularly the construction and position of the automatic clutch. Fig. 36 is a front end view of the box containing the drill-rotating device. Fig. 37 is a cross-section of the drill-socket and spur-wheel, and the four-toothed cam which rotates this socket, in their relative positions at the time of first contact, section on line $X^{10} X^{10}$ of Fig. 38. Fig. 38 is a longitudinal section of the drill-socket and the cam for rotating the socket on a line, $X^9 X^9$, of Fig. 36. Fig. 39 is a cross-section of the drill-socket and cam, showing their relative positions at the time of first contact. Fig. 40 is a cross-section of socket and cam, showing the relative positions at the moment of last contact. Fig. 41 is also a cross-section of cam and socket, showing the socket at rest and the cam in the middle position between last and first contact. Fig. 42 is a face view of the cam-plate in the front of the machine for preventing the outer ends of the hammers from striking against the end of the drill-tool while being rotated past it. Fig. 43 is a development of the curves of the cams upon the cap, Fig. 42. Fig. 44 is a rear end view of one of the hammers. Fig. 45 is a plan view of one of the hammers. This is the outside convex face of the hammer. Fig. 46 is a side elevation of one of the hammers. Fig. 47 is a longitudinal section of a hammer. Fig. 48 is a front end view of a hammer. This is the end which delivers the blow upon the tool. Fig. 49 is a top view of one of the roller-plugs, which are inserted in the gates of the outer frame to form a cam-course for compressing the hammer-springs. Fig. 50 is an axial section of the roller-plug and cam-roller on a line, Y Y, of Fig. 49. Fig. 51 is a side view of the roller, shown in section in Fig. 55. Fig. 52 is a plan view of the flanged plate at the base of the roller. Fig. 53 is a vertical section through line Y' Y' of Fig. 52. Fig. 54 is a plan view of the thrust-plate at the top of the roller. Fig. 55 is a section on line $Y^2 Y^2$ of Fig. 54. Fig. 56 is a vertical axial section of the roller-stem. Fig. 57 is a plan view of the presser-foot, which is used in the automatic feed and is shown in its proper position in Fig. 43. Fig. 58 is a longitudinal section of this presser-foot on line $Y^3 Y^3$ of Fig. 57. Fig. 59 is a cross-section of the presser-foot; and Fig. 60 is a perspective view of the presser-foot.

The principal parts are as follows: A is the supporting-column; B, clamp for attaching the machine proper to its supporting-column; C D, bracket and strap, respectively, in which sleeve E is held; E, sleeve having recess for strap D and for feed-nut G; F, tubular protecting-case inclosing the entire working parts of the machine. This case is cylindrical, with a smaller cylinder, I, inclosing the feed-screw N, placed below the principal cylinder and parallel with its axis. G, tubular feed-nut secured to E; H H, gates carrying cam-wheels U, operating hammers T; I, case of feed-screws; L, box containing crank-shaft for rotating the machine and tool; M, crank-shaft for driving machine; N, feed-screw working in the feed-nut G; O, box or case containing drill-tool-rotating devices; P, drill-tool; R, hammer-frame; S, drum containing locking and releasing levers for the hammers; T, hammers; U U, rollers set in gates H H and forming camway on inside of gates H H to operate hammers; $V^5$, rod for connecting rotating mechanism of drill-tool with driving or crank shaft M. X X Y Y all indicate lines of sections.

The functions to be performed by the various parts and combinations of parts used in this machine may be summed up briefly, as follows: first, devices for attaching the machine to its supporting-column so that it can, as a whole, have the following motions—a motion of translation, which, in the ordinary position of the machine, consists of elevation and depression upon its supporting-column, an angular displacement of its axis in either or both horizontal and vertical planes, rotation around its own axis, a pivotal motion about a line parallel with its own axis, but not coincident with it, a freedom to move, when actuated by the proper mechanism, back and forth in its own axial line; second, devices for protecting the operating parts from dust, retaining the lubricating material, and permitting ready examination of parts when required; third, devices for rotating the frame carrying the hammers and bringing them successively in front of the tool, and at the same time compressing the hammer-driving springs; fourth, devices for locking the hammers when they are forced back against the resilience of their motor-springs and releasing them to give the blow; fifth, devices for producing a slow and intermittent rotation of the tool about its own axis; sixth, devices for automatically feeding the whole machine forward in its own axial line just in the proportion that the tool advances into the rock; and, in connection with this automatic feed, a device for throwing it out and permitting of the withdrawal of the machine or the operation of the feed by hand. These various functions will be considered as far as possible in their regular order.

The machine herein described can be used with any of the supporting devices known to miners—such as tripods, beams, &c.

In the present case the machine is attached to a column, A, by means of a clamp, B. This clamp consists of a ring, B, forming the body or principal part and three arms, two of which, $b^2 b^2$, are flexible, but integral with B, while the third, $b$, is rigid and pivoted to B by means of two lugs, $b^3$. The end of $b$ is slotted to receive the bolt $b^4$, hinged to the outer ends of the two arms $b^2 b^2$, and pressing, when required, against the end of the arm $b$ by means of the nut $b^5$. It is obvious that by turning the nut $b^5$ in the proper direction the three arms $b^2 b^2 b$ will be made to press tightly upon the column A, holding the clamp firmly in place, the flexibility of two of the arms permitting a more secure hold upon the column. A ring and set-screw can be placed beneath the arms of the clamp to support the machine when the nut $b^5$ is released. This clamp permits of the adjustment of the machine to any horizontal angle. The body B of this clamp is ring-shaped, and its circular opening is offset upon both sides, leaving a shoulder, $b^6$. (See Fig. 14.) The bracket C fits into one offset and the plate $c$ into the other. These two parts are made to tightly clasp the ring of clamp B by a stud, $c^2$, and a pin, $c^3$, both fastened to the base of bracket C and fitting through holes in the plate $c$. The plate $c$ and bracket C being thus held together can be made to revolve in the recesses or offsets of the ring B and can be firmly fixed in any desired position by screwing down the nut $c^4$ of the stud $c^2$, which causes the bracket and plate to firmly clasp between them the shoulder $b^6$ of the clamp-ring B, and thus, by the great friction developed, hold the bracket and the machine attached to it in any required position. This gives the adjustment for vertical angles. A strap, D, is pivoted at the bottom by means of the lugs $c^5$ and a pin, $d$, to the bracket C, Figs. 9, 10, and 14. It is kept from turning upon its hinge by a lever, $c^6$, pivoted by a screw-bolt, $c^7$, to the bracket C and locking the strap D by a recess cut in the under side of the lever $c^6$, fitting a corresponding projection or lip, $d^2$, upon the strap D.

In order to securely lock the lever $c^6$ in its place and prevent it from moving away under the effects of the vibrations of the machine, a pin, $c^8$, placed in the center of the handle of lever $c^6$ and pressed forward by the action of the springs $c^9$, fits into a small recess cut in the outward face of lip $d^2$, and causes sufficient resistance to the movement of the lever to keep it in place unless forced out by the application of power to the handle.

The strap D is made in two parts, held together by means of the screws $d^3$ and the stud and nut $d^4$, and is bored to receive the sleeve E, which rests easily on it. The strap D is put together in this way, so that it can be fitted into the groove in sleeve E. The sleeve E is also made in two parts, held together by screws $e$, and is provided outside at its middle with two flanges or projecting rings, $e^2$ $e^2$, between which is a groove, leaving a cylinder of the proper diameter to fit the bore of the strap D, in which it can turn, but is fastened at any point by tightening the nut $d^4$, causing the strap to tightly clasp the sleeve.

The revolution of the whole machine about its own axis is obtained by turning the sleeve E in the strap D. The interior of sleeve E is bored and planed to fit the tubular shell F of the machine, and on its under part a recess is bored in a line parallel with its axis, to receive the forward end of feed-nut G, this being its gearing upon the stationary part of the machine. The feed-nut is held in its recess by the latch $g$, pivoted at $g^2$ to E, and passing through a slot cut in the sleeve fitting over the feed-nut and into a recess cut therein. To keep this latch in place in any position of the machine and to hold it securely, it is made to lock by a thumb-piece or lever, $g^3$, pivoted to $g$, and having its pivot provided with a projection, $g^4$, fitting a recess in the sleeve E when the piece $g^3$ is turned, so that it covers the latch $g$. (For details of these parts see Figs. 15 to 20, both inclusive.) The thumb-piece $g^3$ having been folded over latch $g$, as shown in Fig. 15, the projection $g^4$ engages in its recess in sleeve E and prevents the latch from leaving its place in the slot and groove above described.

To disengage the latch $g$ the piece $g^3$ is first caused to revolve upon its pivot or bolt $g^5$ until it reaches the position shown in Fig. 19. The projection having thus been removed from its recess in sleeve E the latch itself is made to turn upon its pin $g^2$, and is thus withdrawn from its seat in the slot of E and groove of feed-nut, leaving the latter unfastened, as in Fig. 20. The notch in the latch $g$ firmly grasps the feed-nut G when the latch is locked in place, and prevents the rotation of the said nut G when at work.

The whole working mechanism of the machine is completely inclosed in a tubular shell or case, F, the front end, $F^2$, of which is evenly planed to fit the bore of the sleeve E and slide freely in it under the action of either the automatic or the hand-feed devices. Immediately in the rear of the shoulder separating this planed part from the other end are two covers or gates, H H, hinged upon pins $h$, and opening outward and, in the usual position of the machine, downward. The gates H are fitted closely into the openings made to receive them, and bear at their upper end upon the shell F. They are locked by means of the cover $h^2$, pivoted at $h^3$ to the shell F, and having the flanges $h^4$, which fit over the flanges $h^5$, projecting from the gates H, where they meet. At the forward end of the cover $h^2$ a hole is drilled to receive the bolt $h^6$, having the projection $h^7$, made to fit a recess cut in the shell F. On the upper end of the bolt $h^6$ is fastened a thumb-piece, $h^8$. The action of this locking device is very similar to that shown and described to lock the feed-nut. When the thumb-piece $h^8$ is turned, as shown in Fig. 21, the cover can be lifted up, as shown, the thumb-piece assisting the operation by adding length to the leverage of the cover $h^2$. When the cover is raised the gates can be opened. To lock them, they are brought together, the cover $h^2$ turned down upon them, and the thumb-piece, which has been kept extended outward during this first part of the operation, turned over the cover $h^2$, bringing the projection $h^7$ of bolt $h^6$ into its recess and locking the device.

On the under rear part of the shell F, and in a line parallel to its axis, is a cylindrical projection, I, bored out to receive the long cylindrical feed-nut G, which is fastened at one end to the sleeve E by a latch, $g$, previously described.

At the rear end of the shell F, and secured to it by three screws, $l\ l$, is a box, L, holding the driving-shaft M and other devices. The tubular arm $l^2$ receives the shaft M, which rests at its other end in the cap $l^3$, which is screwed to the box L. The cap $l^3$ is made removable, so that the bevel-wheel $m$ can be inserted into the box L. The bevel-wheel $m$ is keyed to the driving-shaft M by a pin. (Shown but not lettered.) The ends of the driving-shaft are made square, to receive the driving-cranks $M^2$. (For details see Figs. 23 and 24.) A steel pivot, $l^4$, is secured by screws $l^5$ to a portion of the internal frame-work or driving-box L in such a position that it is directly in a line with the axis of the machine and at right angles with the driving-shaft M. At the lower part of the box L, extending several inches in the rear, is a tubular projection, $l^6$, corresponding with projection of shell F, and bored out to receive the tubular feed-nut G. The hammers T are carried by a revolving frame, R, which is a tube, from which radiate four ribs. In these ribs recesses are planed to receive and hold the hammers T. The frame R turns in front upon the journal of the cam which rotates the drill-tool, and in the rear upon the hardened steel pivot $l^4$, fitting into a journal-box in the bevel-wheel $m^2$. The frame R, and with it the hammers, is caused to revolve by means of a bevel-wheel, $m^2$, gearing with the bevel-wheel $m$, which is pinned to the driving-shaft M. (See Figs. 32, 33, 34, and 35.)

Looking, now, at Fig. 35, the bevel-wheel $m^2$ is shown secured to a drum, S, by screws $m^3$. The drum S is secured to the revolving frame R by screws $s$, so that bevel-wheel $m^2$, drum S, and hammer-frame R revolve together when the crank-shaft M is turned, and the hammers are successively brought opposite the shank of the drill-tool. In the center of the bevel-gear $m^2$ a hole is bored, to act as a bearing for the steel pivot $l^4$, and a hardened-steel thrust-plate is placed at the bottom of the hole. The hammers T are solid steel bars having grooves planed upon their sides, to make a dovetailed fit in the bearings planed upon the ribs of the hammer-frame R. The hammers must be slid into their places by introducing them endwise. One end of the hammer is solid and cut off square to deliver the blows. The other end has a stem, $t^2$, for the driving-spring and a recess, $t^4$, between this stem and the outside shell, $t^3$, covering the spring. A notch, $t^5$, is made in the end of the stem $t^2$, to lock the hammer in place when its spring is compressed. A portion of a helical curve, $t$, projects from the curvilinear face of the hammer, and acts as a cam, forcing the hammer back against its driving springs when it comes in contact with the rollers U, set helically upon the inside of the protecting shell or case F. When the hammers are placed in their beds upon the revolving frame R, the stem $t^2$ enters a thimble, $r$, secured to the drum S, and also said drum, reaching as far as the locking-lever, which will be more fully described hereinafter. The rollers above referred to (see Figs. 21 and 22) are so arranged that the line of their centers describes a helical curve having a pitch of three inches. These rollers are placed at equal distances from the axis of the machine, and are separated by arcs of equal length. The pitch of the cams upon the hammers corresponds with the pitch of the rollers, and both rollers and cams have corresponding beveled edges of contact.

The operation is as follows: A movement of revolution being imparted to the frame R, the cam $t$ of one of the hammers comes in contact with the roller U, and causes said hammer to move toward the rear of the machine; and to do this it must compress a spring, $t^6$, placed upon the stem of the hammers, and bearing against a thimble secured to the front face of the drum S. The length of the cam $t$ being greater than the distance between the centers of two consecutive rollers, the cam is resting on roller No. 2 before it has left roller No. 1, and the same movement of translation of the hammer continues as the cam is advancing upon each successive roller. When the cam is about to leave roller No. 4, the hammer has moved toward the rear of the machine to the full extent of its path in that direction, and the notch $t^5$ at the end of the stem $t^2$ has come opposite the spring-trigger or roller bearing lever $r^2$, which carries at its end the freely revolving roller $r^3$, and this trigger being pressed toward the axis of the machine by a spring, $r^4$, has lodged in the notch $t^5$. A helical spring, $t^6$, placed upon the stem $t^2$ of the hammer T, and guided by the thimble $t$, in the stem of the hammer, and another thimble, $t^8$, on the flange-plate $s^2$, attached to the drum S, has been compressed during the backward movement imparted to the hammer T, and the resilience of the spring causes the trigger $r^2$ to press firmly into the notch $t^5$, and securely lock the hammer, as shown in the upper part of Fig. 32. Each hammer is thus successively locked. They are in turn released to give their blows by a number of levers, $s^3$, pivoted to the rear face of the drum S, and operated by a stationary cam, $s^4$, on the inside of shell F. These levers press at one end against the upper portion of the triggers $r^2$, and at the other end are suitably curved to act in concert with the fixed cam $s^4$. As the frame R is revolved each lever $s^3$ is in turn brought opposite the cam $s^4$, its outer end forced in, throwing its inner end into contact with the trigger $r^2$, and thus pushing back the trigger $r^2$ against its spring $r^4$, and releasing its roller $r^3$ from the notch in the stem of the hammer. The latter moves suddenly forward under the action of its helical spring and delivers its blow. After the hammer is released the trigger is again pressed inward by its spring, and is ready to lock the next hammer. The rollers $r^3$ are placed at the ends of the triggers $r^2$, to lessen the friction and wear of the parts in contact.

As I usually construct the machine the hammer-actuating springs require a force of two hundred pounds to compress them to their full extent of two inches. All the hammers being actuated, each in its turn, in the manner described, the result of the movement given to driving-shaft M is to cause the delivery of hammer blows upon the tool P, held in a socket, $o^{10}$, the position of the fixed cam $s^4$, which operates the lever $s^5$, and the triggers being such as to release the hammers at the time of their passage in front of the socket.

Going a little more into the details of the construction of the drum, in the rear of the flange $s^2$, and fastened to it by screws, is a cylindrical piece, which I call the "drum." Four holes in a line with the thimbles $t^8$ (see Figs. 32 and 33) are drilled in this drum, and four recesses are milled out to receive the pivoted levers $r^2$, bearing the rollers $r^3$. These levers I call "triggers," and their function has been previously described. These levers are pressed toward the center of the drum by the action of springs $r^4$, attached to plates fastened to the drum. The next important movement to be obtained is the rotation of the drill-tool itself, which must be in the interval between the delivery of two consecutive blows of the hammers. The devices which effect the rotation of the drill-tool are inclosed in a box, O, which is fastened by means of the screws $o^2$, Fig. 38, to the inside of the tubular shell F, at its forward end. A cap, $o^3$, (shown in Fig. 42,) is fastened to the box O by the screws $o^4$, which is provided with two cams, $o^5$ $o^6$. These cams are shown developed in Fig. 43. $o^7$ is a four-toothed cam, provided with journals resting in the bearings bored out for that purpose in the box and cap. This cam is drilled throughout its length, the diameter of the hole in the rear part being much larger than the one reaching the forward part. In the smaller part of the hole is fitted the plunger $o^8$, provided with the head $o^9$. Gearing with this cam is a socket, $o^{10}$, provided with a square hole for the head or shank of the drill-tool P, and resting in bearings in the box O and its cap $o^3$. On the socket $o^{10}$ are eleven teeth. A pivoted pawl, $o^{11}$, is pressed upon the teeth of the socket $o^{10}$ by the action of a spring, $o^{12}$. When the cam $o^7$ is made to revolve continuously one of its teeth comes in contact with a tooth on the socket $o^{10}$, as shown in Fig. 39, and imparts to the latter a movement of rotation which stops when the contact between the two teeth has ceased, as shown in Fig. 40. The distance between two consecutive teeth on the cam $o^7$ being greater than the distance separating two consecutive teeth on the socket $o^{10}$, the motion of the latter does not take place until after an interval of rest. The momentum of the revolving socket is overcome by the spring-pawl $o^{11}$, and this pawl stops it between two teeth, so that the shock from the blow upon the drill is not communicated to the four-toothed cam and its operating mechanism. This position is shown in Fig. 41. The two acting teeth, Fig. 39, being again in contact, the socket revolves, and then again stops, as explained above. Thus the continuously revolving cam $o^7$ imparts to the socket $o^{10}$ an intermittent rotary motion. It will be noticed that the pawl $o^{11}$ also prevents the retrograde movement of the socket $o^{10}$. It now, as regards the drill-turning mechanism, only remains to show the means by which the cam $o^7$ is revolved. For this purpose the front end of frame R is provided with the stem V, fastened to it by means of a pin, $v^2$. This stem is drilled out through its whole length, and its forward end fits into the rear part of the cam $o^7$. As the frame R revolves the stem V revolves with it and turns the cam $o^7$ also. In this way every complete revolution of the hammer-frame causes the drill-tool to turn through about one-tenth of a revolution. The lug $v^3$ of the stem fits into a recess cut in the edge of cam $o^7$, connecting the frame R and the cam together. The center of the drum is bored out and is properly slotted to receive a clutch, $r^6$. (Best shown in Fig. 35.) This clutch $r^6$ is composed of a cylindrical body fitting the bore in the center of the drum S, with a flat projection sliding in a slot cut in the central bore of the drum, and a slot is also cut in the bevel-gear $m^2$, which is a continuation of the slot in the drum S, to receive the clutch $r^6$. The clutch $r^6$ is kept normally in contact with its recess in the wheel $m^3$ by a spring.

The automatic feed is accomplished by the following devices: The feed-nut G is a long hollow cylinder, closed at its forward end by a plug, $g^6$, provided with a groove made to receive the latch $g$, the operation of which has been fully described. The rear end of the feed-nut is provided with an internal thread, and into this thread is screwed the feed-screw N. The feed-nut G passes through the pinion $m^4$, the tubular projection of the case L, the tube I, and reaches the rear part of the sleeve E, where it is fastened. The pinion $m^4$ is fitted so as to revolve freely between the end of the tubular shell F and the rear driving-gear box, L, and is provided with a long hollow cylindrical hub, $m^4$, resting in the bore of $l^6$ in box L. At the end of the tubular part $l^6$ of box L is a cap, $n$, used as a bearing for the rear end of the feed-screw N. This cap $n$ is screwed into the tube $l^6$ and locked by means of a spring and pin. The feed-screw N is provided with a collar, $n^2$, to bear upon the inner face of the screw-cap $n$. A second collar, $n^3$, is fastened to the screw by means of a pin, and bears upon the shoulder of the recess bored out to receive it, thus forming an external bearing. The outer end of the feed-screw N is made square, to fit a crank, which can be placed upon it, when required. At the end of the hub of pinion $m^4$ is a recess made to receive the latch $n^4$, which is fitted into a slot cut in the feed-screw and collar. The notch in the end of the hub of pinion $m^4$ occupies a considerable portion of the circumference. The rear end of the feed-screw N is hollow and is provided with a plunger, $n^5$, upon the stem of which is placed a spring, $n^6$, resting at one end against the inner face of the bush $n^7$ and at the other end upon the shoulder of the plunger itself. The plunger $n^5$ and latch $n^4$ are connected by means of a screw, $n^8$, passing through a slot cut in the journal of feed-screw N. On the end of the stem of plunger $n^8$ is fitted a thumb-piece, $n^9$, held in place longitudinally by the screw $n^{10}$, but free to revolve on the stem. This thumb-piece, Fig. 27, is provided with a projection, $n^{11}$, designed to bear upon the rear face of bush $n^7$. (Shown in Figs. 28 and 29.)

This face is cut in the shape of a cam, so that by turning the thumb piece in the proper direction, the action of the projection starting from the point $n^{12}$ to reach $n^{13}$ is to give the plunger $n^5$ a movement toward the rear, drawing with it the latch and compressing the spring $n^6$. The withdrawal of the latch releases the hub of gear-wheel $m^4$ from its connection with the feed-screw, and thus permits the latter to be operated by hand in either direction, by attaching a crank to the square end of the screw. If the thumb-piece is now turned in the opposite direction, the plunger and latch will regain their former position, the latch $n^4$ entering the recess cut at the end of the hub of pinion $m^4$, and locking the pinion and feed-screw together.

For the purpose of operating the feed automatically a presser-foot, $o^{13}$, (shown in Figs. 57 and 58, and perspective, Fig. 60,) is placed in grooves cut in box O and its cap $o^2$. This presser-foot consists of a short hollow cylinder fitting around the rear part of cam $o^7$, and provided with two projections, which bear against the rear face of the teeth of socket $o^{10}$. A sort of handle runs from one side of the rear end of the cylindrical portion of the presser-foot, and into a small hole in the center of this a rod, $v^5$, enters. This rod $v^5$ passes down through the center of the hollow stem which rotates the cam $o^7$, and is connected at the other end, with the clutch $r^6$, at the rear end of the machine. The rod $v^5$ is kept pressed against the presser-foot by a spring, $v^6$, bearing upon a collar, $v^7$, fastened to the rod $v^5$, and on a shoulder in the bore of the frame R. The position of these parts can be seen in Fig. 4. The pressure of this spring $v^6$ is transmitted to the presser-foot $o^{13}$, and by it to the socket and the drill-tool P, keeping it pressed against the face of the rock upon which it is working. Under the action of the blows the tool advances. The socket pressing upon its shoulder is followed by the presser-foot $o^{11}$ and the rod $v^5$. This allows the rod $v^5$ to move forward, and the clutch $r^6$ is pulled by its spring $r^9$ into the notch in the wheel $m^5$, which is in gear with the pinion $m^4$, connected with the feed-screw N by the latch $n^4$, causing the said wheel to drive the pinion $m^4$, and thus to actuate the feed-screw. The machine then moves forward, and the effect of this motion is to separate the clutch $r^6$ from the wheel $m^5$, thus stopping the general forward motion of the machine; but the rock being continually attacked, the tool advances and the presser-foot follows, allowing the rod $v^5$ to move forward, and thus again connect the clutch to the gear-wheel $m^5$ and turn the feed-screw forward. Thus the automatic forward movement of the machine is regulated accurately by the progress of the drilling, the machine advancing rapidly when the boring is rapidly done, or slowly when the progress of the drill is slow, or stopping altogether if the progress is stopped.

I have explained before how, by using the thumb-piece $n^9$, the automatic action of the machine can be stopped and the feed operated by hand.

Having now fully explained the general principles of the action of the machine, I will describe several important details of construction. While the machine is being used three of the four hammer-driving springs are under more or less tension, and one only is perfectly distended. As it is desirable that all the springs should be without tension when the machine is at rest, I have devised a certain construction to obtain this result, by causing the frame to turn backward when the cams on the hammers T pass on the front edge of the rollers, sending all the hammers forward and releasing all the springs. In order to allow sufficient room for this movement of release, the cap of box O is recessed in its upper part. This cap $o^3$ is provided with a cam-edge between the recess or opening just mentioned and the socket $o^{10}$, the highest point of the cam being at $o^5$. This is done to guide the face or end of the hammer over the shank of the drill P. Without this device, especially in downward drilling, the side of the hammer would strike on the side of the socket or the shank and prevent the working of the machine. On the other side of the socket $o^7$ is a second cam-edge, placed there to receive the end of the hammer and drive the same backward before its cam can come in contact with the first of the cam-rollers on the gates H. The rollers U are constructed so as to retain their lubricating-oil and keep the same at the point where the strain is most severe. The details of the construction of these rollers is shown fully in Figs. 50 to 56, both inclusive. The pivot $u$ of the roller U is made tapering, and its stem, $u^2$, is fitted tightly and pinned by a pin, $u^3$, in the shank of the hole in the steel plug $u^4$. The roller is provided with a plate, $u^5$, made of hardened steel, to receive the thrust of pivot $u$. A second plate or collar, $u^{10}$, Figs. 50, 52, and 53, having a flange, $u^6$, is fastened by a screw, $u^7$, at the opposite end, to prevent the roller from leaving its pivot. The flange $u^6$ of plate $u^{10}$ corresponds with a recess turned at the base of pivot $u$. An oil-hole, $u^8$, reaches from the face of the roller U to the base and into the channel made by the flange $u^6$, Fig. 50. A helical groove, $u^9$, is cut in the tapering hole or bearing of roller U from the oil-hole $u^8$ to the thrust-plate $u^5$. When the roller U is revolving the effect of the groove is to cause the oil to flow toward the thrust-plate. When it is desirable to lubricate the rollers, the two gates H are opened, so as to be as shown in Fig. 22, and a drop of oil is put in each hole. After this the gates are closed, and when at work the roller distributes the oil, as above explained. At the front end of the machine a nose, W, projects, and in this a hole is drilled to receive a pin, $p$, which, by coming in front of the shoulder of the drill-tool, keeps it in place, when its position is vertical, without the aid of any clamping device.

Having now fully described my invention, what I claim, and desire to secure by Letters Patent, is—

1. In a rock-drilling machine, the combination of the inclosing-case F, the gates H, the sleeves E, in which said case can slide freely, the strap D, in which the sleeve E, and with it the case F, containing the entire drill-operating mechanism, can rotate, the locking device, whereby the sleeve E is held to the bracket C, the bracket C, the clamp B, constructed as described, the revolving hammer-frame R, the reciprocating hammers T, the cam-rollers U, the crank-shaft M, the bevel-wheel $m$ $m^2$, for operating the hammer-frame, the hammer-driving spring $t$, the hammer locking and releasing devices, the feed-screw N, working in the feed-nut G, which latter is adjustably attached to the sleeve E by the latch $g$, the spring-rod $V^5$, the presser-foot $o^{13}$, and the latch $r^6$, the drill-socket $o^{10}$, the four-tooth cam $o^7$, rotated by the hammer-frame, and the hollow stem V, all operating substantially as shown and described.

2. In a rock-drilling machine, the combination of the inclosing-case F, the gates H, the hammer-frame R, capable of being revolved upon suitable bearings by means of the bevel-wheel $m$ $m^2$, operated by a crank, the hammers T, capable of being reciprocated in guides upon the hammer-frame R by helical springs $t^6$ and cam-rollers U, the spring-triggers $r^2$, for locking and releasing the said hammers, the feed-screw N, working in the feed-nut G, the pinion $m^4$, gearing with the spur-wheel $m^5$, which in turn is adjustably secured to the bevel-wheel $m^2$ by spring-latch operated by a rod, $V^5$, passing through the hammer-frame and bearing by a presser-foot, $o^{13}$, upon the drill-socket, $o^{10}$, the said drill-socket being intermittingly revolved by a cam, $o^7$, actuated by the said hammer-frame when it is revolved, all being constructed substantially as described, and for the purpose set forth.

3. In a rock-drilling machine, the combination of the feed-nut G, locked to the sleeve E by the latch $g$, the feed-screw N, revolved by the pinion $m^4$, which is also connected with the feed-screw N by a spring-latch, released, when required, by means of the thumb-piece $n^3$, the said pinion $m^4$ being in its turn revolved by the spur-wheel $m^5$, secured to the bevel-wheel $m^2$ by a latch, $r^6$, the said latch being retained in its place by a spring, $r^9$, and released by the rod $V^5$, which passes through the center of the hammer-frame and bears at its opposite end by means of a presser-foot, $o^{13}$, upon the end of a tool-socket, $o^{10}$, against which it is pressed by a spring, $v^6$, the bevel-wheel $m^2$, above referred to, being driven by a bevel-wheel, $m$, capable of being turned by a crank, and the whole operating substantially as described to feed the drill-tool forward in measure as it penetrates the rock.

4. In a rock-drilling machine, the combination of the tubular feed-nut locked to the ring in which the case of the machine slides, a feed-screw bearing in the inclosing-case at one end and at the other end working in said feed-nut, a pinion locked to the feed-screw by a clutch when automatic feed is not required and gearing with a wheel which is caused to rotate with the hammer-frame by a latch catching in the bevel-wheel which drives the said hammer-frame, the said latch being operated automatically by a rod passing through the center of the hammer-frame and kept pressed against the tool-socket by suitable springs, the whole operated substantially as set forth to feed the tool forward in measure as it penetrates the rock.

5. In a rock-drilling machine, the improved device for regulating the feed automatically, consisting of the presser-foot $o^{13}$, bearing against the drill-tool socket $o^{10}$, the rod $v^5$, passing freely through the center of the hammer-frame, held against the presser-foot $o^{13}$ by the spring $v^6$, and at its other end entering a latch, $r^6$, which passes through the bevel-wheel $m^2$ and locks it to the spur-wheel $m^5$ as long as the tool enters the rock fast enough to allow of the distention of the latch-spring $r^9$, and releasing the said spur-wheel $m^5$ when the tool meeting greater resistance presses, by means of the presser foot and rod $v^5$, against the latch $r^6$, compressing its spring and withdrawing it from its notch in the wheel, the whole operating substantially as shown and described.

6. A supporting device consisting of the combination of the following parts: a clamp of any suitable construction provided at one end with a ring, B, which has an internal flange, $b^6$, a bracket, C, to which the machine is attached, and a circular plate, $c$, held to the bracket C by a pin, $c^3$, and a bolt, $c^2$, the flange of the said ring B being tightly clasped by the bracket and plate when the eccentrically-placed bolt $c^2$ is tightened, substantially as described, and for the purpose specified.

7. In a rock-drilling machine, the combination of the sleeve E, in which the tubular inclosing-case F rests and can be fed forward by the feed-screws N, turning in the feed-nut G, the said feed-nut G being provided with a locking device for holding it in place, which locking device consists of a lever, $g$, pivoted at $g^2$, and having a notch which fits over the nut and into a groove cut in it, a thumb-latch, $g^3$, held to $g$ by a pivot, $g^5$, and provided with a lip, $g^4$, which can engage with a lip upon the sleeve E, all the said parts co-operating to secure the feed-nut G, so that it can neither be withdrawn nor rotated, all constructed substantially as shown and described.

8. In a rock-drilling machine, the toothed-cam $o^7$, rotated by a shaft connected with the main driving-gear and itself meshing with the toothed outer circumference of the drill-socket $o^{10}$, the said socket having a polygonal hole for the shank of the drill-tool, in combination with a pawl, $o^{11}$, pressed by a spring firmly against the socket $o^{10}$, so that it is stopped after receiving its required portion of a revolution and before the next tooth comes in contact with the succeeding tooth of the cam $o^7$, thus preventing the transmission of shocks injurious to the working mechanism of the machine.

9. In a rock-drilling machine, the combination of hammers capable of being reciprocated by suitable springs and cams, in a frame which can be revolved by suitable mechanism about an axis parallel with the axes of the hammers, with spring-triggers bearing friction-rollers at their ends, the said triggers being pivoted to a drum attached to the revolving hammer-frame and pressing at one of their ends into notches in the ends of the hammers and at the other ends bearing against pivoted levers or pawls upon the face of the drum, which levers or pawls are in turn forced against the triggers by being brought in the course of the rotation of the machine against a cam affixed to the inclosing-case of the machine, all substantially as shown and described, and for the purpose set forth.

10. In a rock-drilling machine, a loosely-fitting helical spring bearing at one end against a conical internal support or thimble upon a stem of the reciprocating hammer, and also at the other end bearing upon a like thimble secured to the revolving hammer-frame opposite the end of the hammer, in combination with the said hammer-frame and hammer, all constructed substantially as shown and described.

11. In a rock-drilling machine, a hammer reciprocating in a revolving frame by means of a helical driving-spring surrounding a stem forming a part of the hammer, the said spring being compressed by cams upon the stationary frame of the machine and upon the hammer, which is itself rotated about an axis parallel but not coincident with its own axis, by a crank and intermediate gearing, in combination with a pivoted and spring-actuated trigger bearing upon its end a friction-roller which engages in the notch in the end of the said hammer and locks it when the hammer-driving spring is compressed, and releases it, when required, by a pawl or lever operated by a cam fixed upon the inclosing-case of the machine, all constructed substantially as shown and described.

12. In a rock-drilling machine, a cylindrical inclosing-case provided with gates hinged to a narrow strip, forming an integral portion of the case above referred to and constructed to expose, when opened, almost the entire circumference of the inclosed working mechanism, the said gates being locked, when closed, by a flanged lid fitting over small flanges upon the edges of the gates, and this lid being itself secured by a latch pivoted to it and locking by means of a projecting lip fitting into an undercut portion of the inclosing-case, all constructed substantially as and for the purpose set forth.

13. In a rock-drilling machine, a cylindrical inclosing-case provided with hinged gates, on the inside of which freely-revolving rollers are set to form a helical cam-course acting in concert with cams upon the hammers to compress the hammer-driving springs, the whole being constructed and arranged, substantially as shown, to permit of the easy examination, cleaning, and oiling of the working parts.

14. A machine-hammer consisting of a single solid bar of steel, substantially a sector in its cross-section, the radial sides of the bar being grooved to slide in a hammer-frame and the curvilinear face being provided with a cam forming a portion of a helix, said hammer being further shaped at one end for the delivery of a blow, and at the other end formed into a stem for a helical driving-spring, and a notch by which the hammers can be locked in place upon its frame when required, all constructed substantially as shown and described.

15. In a rock-drilling machine, reciprocating hammers mounted to slide freely in guides upon a revolving frame, the said hammers being each provided with coiled driving-springs and a cam which forms a portion of a helix, in combination with freely-revolving rollers mounted upon the inside of the inclosing-case of the machine in a helical curve of like pitch, the said rollers acting in concert with the cams upon the hammers to force the hammers back against their actuating-springs when the hammer-frame is revolved, all constructed substantially as and for the purpose set forth.

16. In a rock-drilling machine, a nose or projection upon the working end of the case of the machine, having a removable pin so placed that when the said pin is in position it presses against the shoulder of the drill-tool and prevents its falling from its socket in the machine, constructed substantially as and for the purpose set forth.

17. In a rock-drilling machine, the combination of a tubular case for inclosing and protecting the working mechanism with a hollow cylindrical sleeve in which the said case rests and can slide freely in the direction of its length, but cannot rotate, and with a strap made in two parts secured together, encircling the said sleeve in a groove, the sleeve, and with it the entire case of the machine, being free to rotate about its longitudinal axis, substantially as shown and described.

18. The clamp for securing the machine to its supporting-column, consisting of a base, B, to which the machine is attached, having integral therewith two springing or yielding curved arms, $b^2 b^2$, and a rigid curved arm, $b$, hinged to the base B, and notched at its other end to receive the end of the eyebolt $b^4$, which is hinged to the yielding arms $b^2 b^2$, the said bolt $b^4$ being provided with a nut, $b^5$, to bear against the arm $b$, and thus draw the arm $b$ and the yielding arm $b^2 b^2$ together, to firmly clasp the supporting-column or other cylindrical object; substantially as shown and described.

19. In a rock-drilling machine, the combination of a tubular case for inclosing and protecting the working mechanism, with a sleeve in which the said case rests and can slide freely in the direction of its length, a strap encircling the said sleeve in a groove prepared for it, and a bracket secured to the supporting-column of the machine and to which the strap is hinged by suitable lugs and a pivot, and locked by a hand-lever, which, when released, permits the machine-inclosing case and the sleeve to be rotated about an axis parallel with but not coincident with the axis of the case, as and for the purpose specified.

20. In a rock-drilling machine, the device for intermittently rotating the drill-tool, consisting of the combination of the revolving hammer-frame R, the hollow stem V, pinned to the said frame and revolving with it, the four-toothed cam $o^7$, rotated by a lug upon the stem fitting into a recess cut on the end of the cam, and the socket $o^{10}$, provided with teeth meshing with the teeth of the cam $o^7$, all constructed substantially as shown and set forth.

In witness whereof I have hereunto set my hand.

EUGÈNE MOREAU.

Witnesses:
JOHN M. O'BRIEN.
HARTSHORN WHITE.